US008386315B1

(12) United States Patent
Bala et al.

(10) Patent No.: US 8,386,315 B1
(45) Date of Patent: Feb. 26, 2013

(54) YIELD MANAGEMENT SYSTEM AND METHOD FOR ADVERTISING INVENTORY

(75) Inventors: Aravind Bala, Bellevue, WA (US);
Richard E. Chatwin, Cupertino, CA (US); Brian B. Jones, Sunnyvale, CA (US); Ismail Ahmet Nalcacioglu, Santa Clara, CA (US); Sanjay Ranka, Cupertino, CA (US)

(73) Assignee: Carl Meyer, Saratoga, CA (US)

( * ) Notice: Subject to any disclaimer, the term of this patent is extended or adjusted under 35 U.S.C. 154(b) by 1967 days.

(21) Appl. No.: 10/024,630

(22) Filed: Dec. 17, 2001

Related U.S. Application Data (60) Provisional application No. 60/294,743, filed on May 30, 2001.

(51) Int. Cl.
*G06Q 30/00* (2012.01)
(52) U.S. Cl. .................................. 705/14.43; 705/14.41
(58) Field of Classification Search ............... 705/14.41, 705/14.43
See application file for complete search history.

(56) References Cited

U.S. PATENT DOCUMENTS

| | | | |
|---|---|---|---|
| 5,617,538 A | 4/1997 | Heller | |
| 5,727,129 A | 3/1998 | Barrett et al. | |
| 5,809,481 A | 9/1998 | Baron et al. | |
| 5,848,397 A | 12/1998 | Marsh et al. | |
| 5,873,068 A | 2/1999 | Beaumont et al. | |
| 5,884,305 A | 3/1999 | Kleinberg et al. | |
| 5,930,764 A * | 7/1999 | Melchione et al. | 705/10 |
| 5,937,037 A * | 8/1999 | Kamel et al. | 379/88.19 |
| 5,937,392 A | 8/1999 | Alberts | |
| 6,029,176 A * | 2/2000 | Cannon | 707/104.1 |
| 6,128,624 A * | 10/2000 | Papierniak et al. | 707/104.1 |
| 6,128,651 A | 10/2000 | Cezar | |
| 6,161,127 A | 12/2000 | Cezar et al. | |
| 6,170,011 B1 * | 1/2001 | Macleod Beck et al. | 709/224 |
| 6,182,059 B1 | 1/2001 | Angotti et al. | |
| 6,236,977 B1 * | 5/2001 | Verba et al. | 705/10 |
| 6,330,543 B1 * | 12/2001 | Kepecs | 705/14 |
| 6,421,675 B1 * | 7/2002 | Ryan et al. | 1/1 |
| 6,654,725 B1 * | 11/2003 | Langheinrich et al. | 705/14 |
| 6,714,975 B1 * | 3/2004 | Aggarwal et al. | 709/224 |
| 6,954,731 B1 * | 10/2005 | Montague | 705/7.33 |
| 7,010,495 B1 * | 3/2006 | Samra et al. | 705/14.41 |
| 7,031,932 B1 * | 4/2006 | Lipsky et al. | 705/14.41 |
| 7,039,599 B2 * | 5/2006 | Merriman et al. | 705/14 |
| 2002/0023094 A1 * | 2/2002 | Kohda et al. | 707/104.1 |

\* cited by examiner

*Primary Examiner* — James W Myhre
(74) *Attorney, Agent, or Firm* — David H. Judson (57) ABSTRACT

System, method, computer program and computer program product automate and optimize process of placing advertising campaigns on available inventory. When visitor loads one of publisher's web pages, system will be queried for advertisement that should be shown. System periodically analyzes performance data to determine optimal allocations. When queried, identifies advertiser campaign and advertisement to be shown. Results of that visitor encounter are logged or recorded for future analysis. Determination of campaign placements may advantageously be a two-phase process. First, campaign is efficiently tested on the inventory most likely to produce good results. The testing module dynamically adapts, adjusting the amount of testing on different channels until a sufficient determination of the creative performance on different channels can be made. The second phase is the resource allocation. Campaign performance data and contractual constraints are formulated as a network problem. Efficient methods for solving network problems are well known. These two phases may be further subdivided if necessary.

7 Claims, 4 Drawing Sheets

YIELD MANAGEMENT SYSTEM AND METHOD FOR ADVERTISING INVENTORY

RELATED APPLICATIONS

U.S. Patent Application Ser. No. 60/294,743 filed May 30, 2001 entitled Yield Management System for Advertising and Related Inventories; and U.S. patent application Ser. No. 09/586,387 filed Jun. 2, 2000 entitled Method, Algorithm, and Computer Program for Optimizing the Performance of Messages Including Advertisements in an Interactive Measurable Medium, are related applications, and are hereby incorporated by reference.

FIELD OF THE INVENTION

This invention relates generally to systems, methods, computer program products, and operating models for improving and optimizing the performance of messages, advertisements, and other content, and more particularly to systems, methods, computer programs products, and operating models for optimizing the performance of advertisements, splash pages, landing pages and other content and messages in an interactive measurable medium such as a global network of interconnected information devices and appliances, where an example of such a global network is the Internet.

BACKGROUND

Many electronic publishers, especially those who maintain World Wide Web sites, generate revenue by selling advertisements. Typically, publishers make contracts with advertisers that promise a certain number of impressions (where a viewer sees an advertisement) or clicks. Publishers may have significant flexibility about the location on the Web site, or "channel," that advertisements are shown. In addition, many contracts are structured so that the publisher only receives revenue when a visitor actually clicks on a banner or performs an action on the advertiser website after clicking on the banner. Thus, the publisher wishes to generate as many clicks or actions as possible from his inventory. Even when the contract specifies that the publisher is paid by the number of advertising impressions served, the publisher may wish to optimize the campaign performance to demonstrate the superiority of its inventory and secure the advertising account.

Currently, the process of determining the placement of campaigns on publisher inventory is manual, tedious, and imprecise. Typically, the publisher will choose inventory for a campaign when it begins, based on experience of successful placements. Since the process of manually changing placements can be laborious, the original placements are revisited very rarely. Furthermore, it is impractical to manually test different placements for a new campaign. Thus, campaigns are often not placed optimally to begin with, and they are not dynamically adjusted to respond to changes in visitor behavior, channel availability, and the performance of other campaigns. Adherence to campaign contractual requirements requires constant vigilance; if such manual vigilance cannot be applied, then the publisher may under- or over-deliver on contracts. Such inefficiencies cost the publisher indirectly (in the form of potentially forgone revenue) or directly (in the form of penalties for contracts not met.)

There are three main types of contracts prevalent in the online advertising market: CPM, CPC, and CPA. Advertisers pay for CPM ("cost per thousand [impressions]") contracts based on the number advertisements displayed to visitors ("impressions"). Contracts typically specify the number of impressions to be served within the contract time frame (often, one month) and sometimes specify minimum daily impression requirements as well. For such contracts, payment is made whether or not the visitor responds to the advertisement. While the publisher does not have a direct monetary incentive to deliver superior performance to a CPM customer, the publisher does receive an important indirect benefit: a successful advertising campaign on the publisher's inventory will strongly encourage future media purchases. Some CPM campaigns are "run-of-site," meaning that the advertiser may be assigned any available publisher impressions, regardless of where on the publisher's web site those impressions might be. However, most CPM contracts stipulate that the impressions must be provided on a certain location within the web page. Advertisers typically choose locations felt to select desirable customers; for example, a travel-services company might choose to advertise in the travel section of a portal site.

Advertisers pay for CPC ("cost per click") contracts based on the number of visitors who click on an advertisement. In this case, the publisher does not receive any compensation for advertisement impressions that do not result in a visitor click. Contracts typically specify the number of clicks to be delivered within a given time frame (e.g., one month). Clearly, such contracts provide a direct incentive to publishers to optimize the advertiser's campaign, in order to get as many clicks as possible from the available inventory. CPA ("cost per action") contracts are very similar to CPC contracts, except that payment to the publisher is made in proportion to the number of visitors who not only click on an advertisement to visit the advertiser's site, but also complete some desirable action, such as making a purchase, signing up for a newsletter, joining a club, etc. Almost all CPC and CPA campaigns are run-of-site; as the publisher bears the responsibility to generate clicks or actions, the publisher retains the right to place advertisements on various locations as it sees fit. However, for some CPC and CPA campaigns the publishers may be forced to show ads on particular locations on the site.

While publishers have significant latitude in the placement of advertisements on available inventory, both for run-of-site CPM campaigns and for CPC/CPA campaigns, no automated system for optimizing these placements has previously existed. Publishers have estimated or guessed the efficacy of different advertising campaigns, made assignments of campaigns to locations, and then later reassess their success. The process requires significant manual analysis, manual adjustment of placements, and guesswork to meet contractual requirements.

SUMMARY

In one aspect, embodiments of the invention automate and optimize the process of placing advertising campaigns on available inventory. When a visitor loads one of the publisher's web pages, the system will be queried for the advertisement that should be shown. The system periodically (for example, daily) analyzes performance data to determine the optimal allocations. When queried, it identifies the advertiser campaign and advertisement to be shown. The results of that visitor encounter are logged or recorded for future analysis.

In one embodiment, the determination of campaign placements is a two-phase process. First, a campaign is efficiently tested on the inventory most likely to produce good results. The testing module dynamically adapts, adjusting the amount of testing on different channels until a sufficient determination of the creative performance on different channels can be made. The second phase is the resource allocation. The campaign performance data and contractual constraints are formulated as a network problem. Efficient methods for solving network problems are well known. Those workers with ordinary skill in the art will recognize that these two phases may be further subdivided if necessary.

A publisher using the inventive system will find not only that the tedious manual effort formerly required for the placement of advertising campaigns will be automated, but also that the results will be improved via the application of optimization technology. The publisher will enter the available channels into the system, providing information about the size of the advertisements that fit in the channel, the historical daily traffic to the channel, and the like. The publisher will also enter information about the advertising contracts, including the minimum required clicks or impressions, the fee structure, the deadlines, and any other constraints. The system will then calculate the optimal allocations on a regular basis (for example, on a daily basis), and determine the best advertisement upon query for each visitor.

The inventive system is flexible and can handle the variety of contract types prevalent in the industry, as well as new variations and types of contracts that may be introduced in the future.

1.0 DETAILED DESCRIPTION OF EXEMPLARY EMBODIMENTS 1.1 Definitions

In this section, we briefly define some of the terms that are used throughout this description.

Stage: While visitors view advertisements continuously, reports on advertising traffic and success are generally available at regular intervals. We will call the intermediate time between two reports as a stage. In most cases, optimization will be performed once per stage.

Publisher: Publishers are individuals, corporations, or other entities that make content available over an interactive measurable medium such as the Internet, the World Wide Web, or other interconnected network of servers, computers, and/or information appliances. In many cases, publishers will make some portion of their publication available for sale to advertisers.

Inventory: Inventory is that portion of a publication made available by the publisher for sale to advertisers. Inventory is generally measured in impressions, the number of times that a given piece of inventory is viewed over an interactive measurable medium such as the World Wide Web.

Click-through: When a visitor views an advertisement on a publisher's web page, she may decide to click on the advertisement to arrive at further advertising content. This action is counted as a click-through.

Actions: In many cases, publishers and advertisers are interested in visitor actions other than clicks, either for contractual or other reasons. For example, parties may be interested in customer applications, purchases, sign-ups, or other actions. Performance of advertisements is sometimes measured with respect to such actions.

Creative: Advertising creative refers to the actual advertisement as designed. Many practitioners use the term "creative" to refer to banner ads; however, more generally, "creative" may refer to banner advertisements, other graphical advertisements, text messages, emails, splash pages, or any other advertisement or content.

Campaign: Advertisers typically organize their advertisements into an advertising campaign. A campaign may include a number of different creative, may last for some specific period of time, and may have certain special constraints associated with it.

Figure 1:
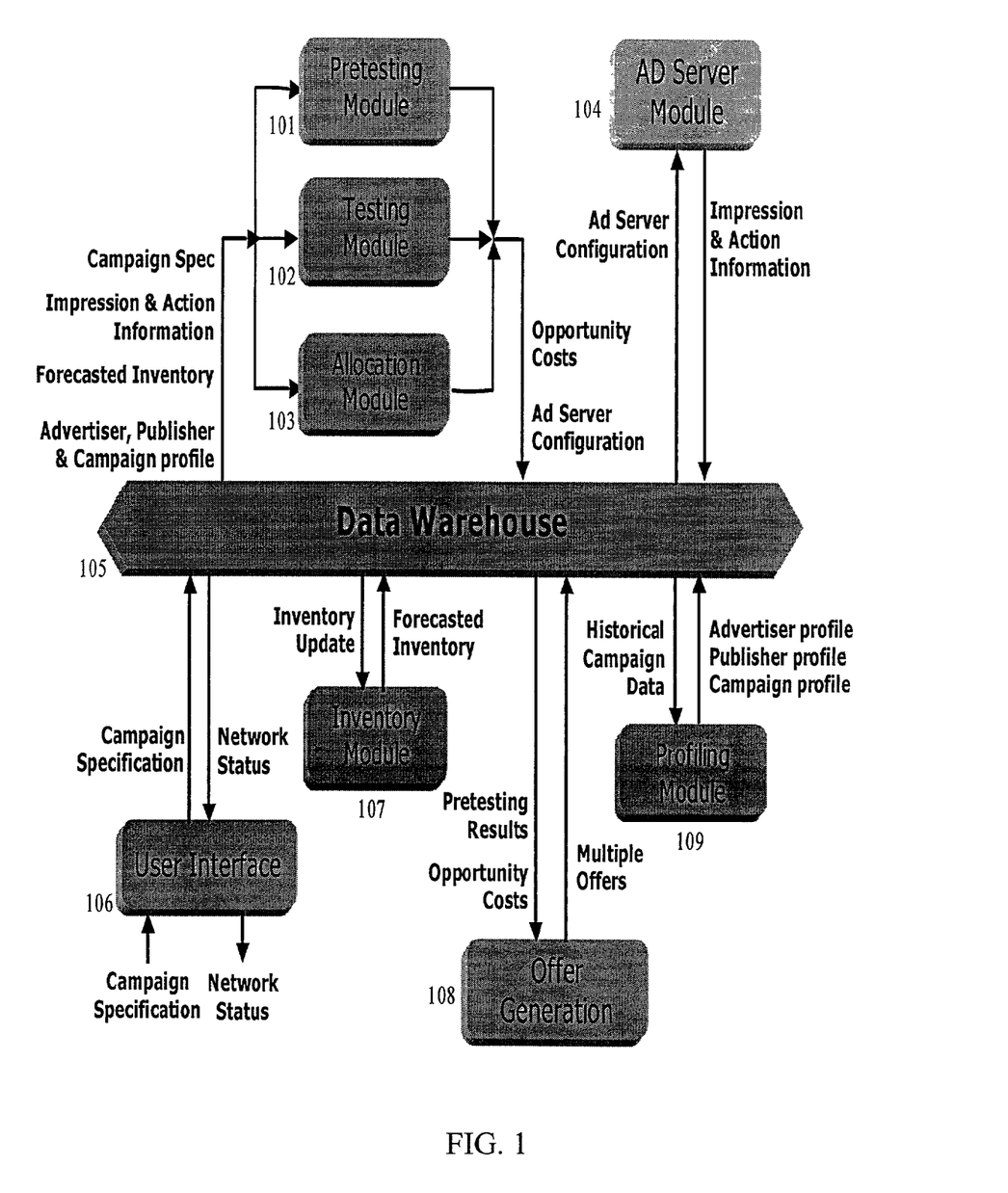
FIG. 1 is a diagrammatic illustration showing a schematic view of an embodiment of the inventive system.

An embodiment of the inventive system is depicted in FIG. 1. Each of the modules interfaces through the Data Warehouse 105.

1.2 Data Warehouse

The Data Warehouse 105 stores all performance data, contract data, and system status, and is responsible for job control functionality. At the end of each stage, the Data Warehouse 105 collects the performance data on each campaign from the Ad Server module 104 and makes it available to the other modules. (Note that the Ad Server module 104 could be a part of the system, or could be a separate or other independent system.) In addition, the Data Warehouse 105 acts as a repository for contractual requirements and constraints, and serves to manage the scheduling and interaction between the various modules. The Data Warehouse 105 may comprise a single storage site or entity or a plurality of distributed storage sites or entities.

1.3 Testing Module

Once the campaign placement problem has been properly formulated (as described elsewhere in this description) as a network problem, many techniques are known to solve it. However, the most efficient techniques generally assume that the performance of every campaign on every channel is known. In fact, such performance information is generally lacking, and frequently sorely lacking. While it is well known that different campaigns and different creative exhibit very different performance (that is click-through rates, post-click action rates, or the like), the performance of campaigns and creative cannot be reliably predicted ahead of time. In addition, creative performance often changes over time, so even if historical data is available, it may not be indicative of current performance.

A number of effects complicate the measurement of campaign performance. The most important of these are the natural statistical fluctuations. Because advertising click-through rates are very low—typically less than one percent—a large number of impressions generates only a few clicks or post-click actions. Fundamental laws of statistics guarantee that such processes will always exhibit statistical fluctuations; therefore, the number of clicks achieved in one day might be significantly different than the number of clicks achieved in the next day, even though nothing or substantially nothing about the creative and/or the environment has changed, for example, the same number of impressions, the same location on the page, the same sorts of visitors, and the like. Therefore, the statistical error in the measured success rate is often quite large.

Optimizing campaign placement on the basis of performance data with large errors will lead to poor results. Due to statistical outliers, many campaign/channel combinations will appear to have very high performance, when in fact they will not perform at that level for an extended period. The optimization algorithm will "chase the noise," allocating each campaign to a different channel every day, according to which statistical fluctuation is the largest.

One way to avoid this scenario would be to allocate a large number of impressions to every campaign/channel combination, so that the performance of every combination could be well characterized. However, this would result in a large amount of inventory being used in the testing process; inventory that could otherwise be used more optimally. This inefficiency would lead to an undesirable profit loss.

The inventive system therefore advantageously applies a testing module 102 to characterize campaign/channel combinations before they are optimized. The testing module 102 efficiently measures the performance of campaigns so that they may be optimally placed. If insufficient testing is performed, the Allocation Optimization module 103 will make decisions based on faulty performance data, leading to suboptimal allocations. If excessive testing is performed, too much inventory will be spent on testing campaigns in sub-optimal configurations, again leading to poor performance. An efficient yield management system should optimally choose the amount of testing so that the overall performance is maximized.

Because the Allocation Optimization module 103 will place campaigns in such a way to obtain an overall optimal result, not every campaign will be placed on the inventory where it performs best. Some inventory may perform very well for a number of campaigns. Therefore, it will be necessary to establish the performance of a campaign on a number of different channels.

However, as noted above, it is counterproductive to establish campaign performance on too many channels. It will be advantageous to limit the options available to the Allocation Optimization module 103 for two reasons. First, the Allocation Optimization module 103 requires an estimate (albeit only a rough estimate may be required) of the performance of a campaign on every channel available to it. By reducing the number of channels that the Allocation Optimization module 103 is permitted to use for a given campaign, we reduce the number of combinations that must be tested. The inventory that would have been used for testing can then be diverted to generating revenue. The second reason to limit the options available to the Allocation Optimization module 103 is to reduce the time taken by the allocation algorithm. Generally, this time depends on the number of possible channels each campaign can be allocated.

Of course, when we limit the options available to the Allocation Optimization module 103, we introduce the possibility that we will exclude a priori a very effective campaign/channel combination (known as an arc). The testing module 102 is designed to identify a subset of combinations that is expected to perform well; minimizing the chances of excluding an effective arc while also minimizing the inventory to be spent on testing.

This limiting of options available to the Allocation Optimization module 103 occurs in two steps. The first step occurs before any testing has been performed. Depending on the number of channels in the system, the number of arcs on which a given campaign might be placed could be very large. If the total number of possible arcs for a campaign exceeds around thirty, it is advantageous to limit the total number of arcs to be tested. A subset of the arcs is selected, either randomly, or by a profiling module that determines a subset of available arcs based previous data of the performance of other campaigns on the available channels. This profiling module predicts the value of the available arcs based on the performance of similar previous campaigns on those and similar channels. The size of the resulting subset depends on the availability of inventory, the size of the advertising contracts, the number and type of other advertising campaigns, and the like. In many cases, the resulting subset has roughly thirty to fifty arcs, though the actual number may be chosen optimally for the situation at hand.

This initial subset of arcs is then tested by the testing module 102. The testing module 102 further sorts them into arcs likely to be useful to the Allocation Optimization module 103, and arcs not likely to be useful. This second subset of arcs is then passed to the Allocation Optimization module 103 as possibilities for assignment. The Allocation Optimization module 103 may then assign the campaign to one or more of the arcs in the second subset.

The testing module 102 is designed to be replaceable, so that improved methods may be easily substituted. In one embodiment, the testing module 102 runs in two stages. In the first stage, a small number of impressions are allocated to each arc. The arcs are then sorted by click-through rate, and a predetermined, larger number of impressions are then allocated to the top N arcs, where N is typically chosen to represent ¼ to ⅓ of the total available arcs. However, N may be advantageously chosen to be less than ¼ of the available arcs, especially if many arcs or available; or more that ⅓ of the total available arcs, up to an including all of the arcs.

1.4 Allocation Optimization

Figure 2:
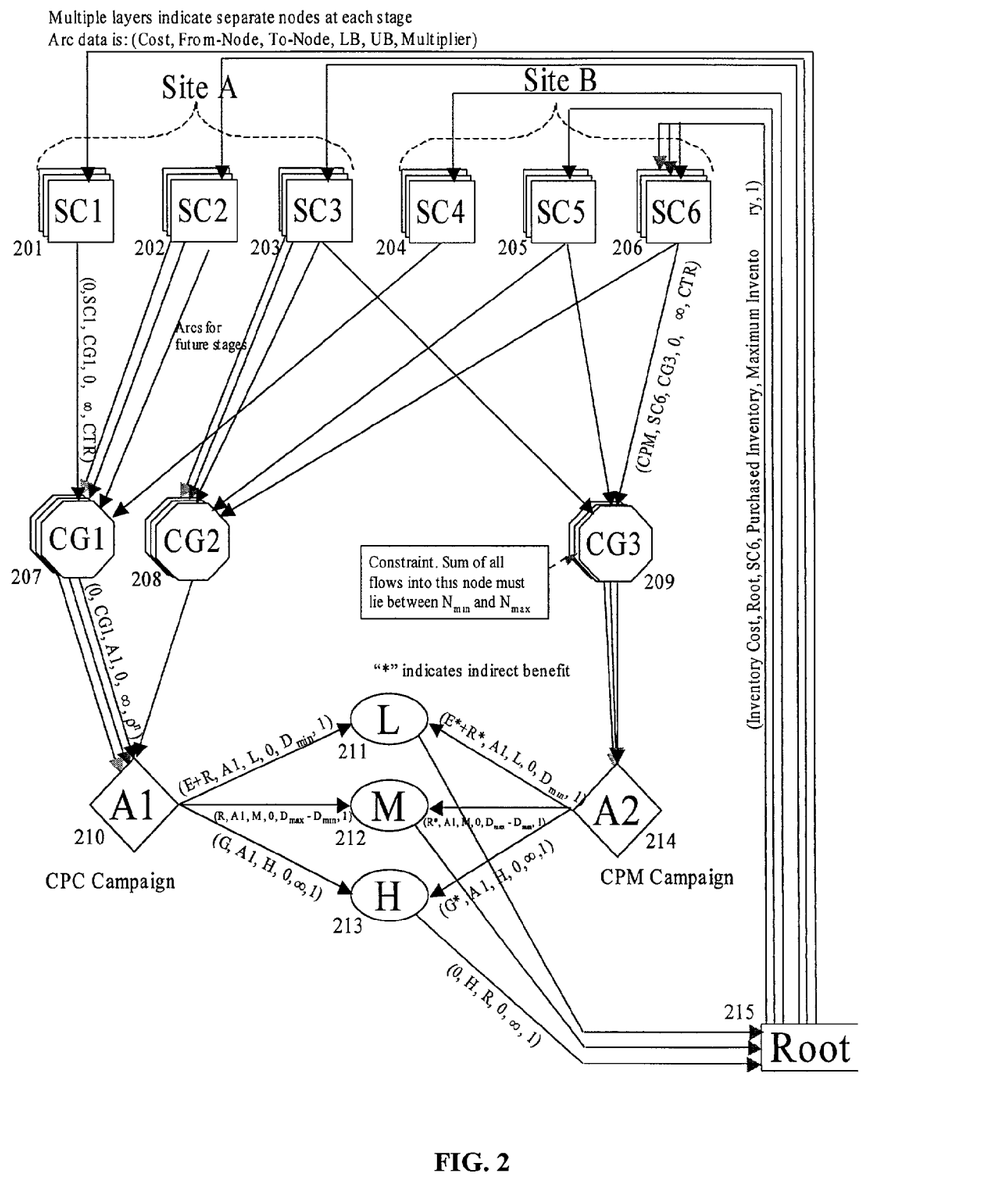
FIG. 2 is a diagrammatic illustration showing an embodiment of a network structure that may be used by embodiments of the allocation optimizer.

The Allocation Optimization module 103 formulates the performance data and contract information as a network problem, and solves the resulting problem using well-known efficient techniques. An exemplary network structure embodiment is depicted in FIG. 2.

Given an advertising network with:
A set of campaigns (h∈H) (for example, 210, 214)
A list of creatives ((h,i)∈$I_h$) for each campaign (h∈H)
A set of channels (j∈J)
A list of sub-channels ((j,k)∈$K_j$) for each channel (j∈J) (for example, 201-206)

The arc ((h,i),(j,k))∈V (arc set) if creative (h,i) can be displayed in channel (j,k). Note that it is not necessary to have a complete advertising network. A "sub-channel" is a subset of a publisher channel, usually defined in terms of a set of demographic or psychographic variables. Subchannels may be defined externally to the yield management system, or be defined by the Profiling module 109 described below.

Although not necessary in all situations, it is generally advantageous to separate the optimization of the placement of campaigns on particular inventory from the optimization of the particular creative from that campaign that should be shown. For a single campaign-channel combination, the inventive system may choose to show one or more creative from that campaign. Generally, several creative will be available, and some will perform better than others. For the purposes of network optimization, in one embodiment the campaign performance is taken either as the impression-weighted average creative performance on that channel, or the maximum creative performance on that channel. If the network optimization were performed at the creative level, only the best-performing creative would be allocated to the channel. However, improved performance can be achieved by allocating impressions to a high-performing subset of the available creative until the best creative can be identified in a statistically significant way. In one embodiment, the inventive system can use the algorithm in U.S. patent application Ser. No.

09/586,387, filed Jun. 2, 2000 and entitled Method, Algorithm, and Computer Program for Optimizing the Performance of Messages Including Advertisements in an Interactive Measurable Medium; (which application, description and described methods are incorporated herein by reference) to determine the creative to be shown on each campaign-channel allocation. Other algorithms, procedures, and methods may alternatively be used to determine the creative to be shown on each campaign-channel allocation.

In one embodiment, the formulation assumes the following four conditions (other embodiments may make some or none of these assumptions):

(1) Optimization (planning for allocating channels' inventory based on all campaigns' demand and current performance information) is done with a multistage horizon but only the first stage allocation is implemented. That is to say, the optimization formulation will contain information about the availability of channel inventory for many stages (e.g., days) into the future, as well as information about campaign requirements, especially deadlines. This will allow the optimization engine to plan allocations into the future, taking advantage of channel inventory expected to become available, and meeting requirements of campaign deadlines. However, the allocations actually sent to the Ad Server module 104 will remain in effect for only a single stage (or a few or other identified number of stages. At the next stage, the Allocation Optimization module 103 performs an incremental optimization of the previous allocations, or alternatively will re-optimize the entire system, including all stages out to the (possibly new) horizon, including any new data that has been gathered since the last optimization. This allows the optimization to adapt to unforeseen circumstances, statistical fluctuations, or other changes in the system such as addition of new campaigns, or the like.

(2) Because the system may optimize many days into the future, it may require forecasts of the amount of inventory available on each channel. These forecasts will typically be made based on the actual inventory available on the publisher's channels and subchannels in the past, and possibly accounting for additional factors, such as seasonal variation, the effect of the day of the week, time of the day, or holidays. In addition, forecasts may be required and be made for future demand. While the current contractual requirements are explicitly accounted for in the network formulation, it may be advantageous to forecast the number and type of new advertising contracts likely to be formed over the time span of the optimization. The impact of these contracts can be modeled either by the explicit inclusion of placeholder campaigns in the network structure, or by a suitable reduction in the forecasted available inventory.

(3) The network is penalized when a campaign is given fewer clicks than the minimum number of clicks defined in a contract within the contract horizon. When a campaign is given more clicks than the maximum number defined by the contract, the pricing scheme for the additional clicks may be altered. The exact pricing will be determined by the contract, as a result of the offer generation process discussed above. In particular, the penalty for delivering fewer than the minimum number of clicks might be zero. In one embodiment, when the advertiser has a firm cap on the maximum expenditure, it may be advantageous to set the price for additional clicks to zero. Some customers may find it useful to have the price for additional clicks at the same as, at one-half the usual price, at some other fraction of the usual price, or on some other basis.(4) In many cases, the network may be formulated as a linear network. The formulation of a linear network allows the use of even more efficient solution techniques. Linear network solution methods are well known; for example, see *Linear Network Optimization* by Dimitri P. Bertsekas (MIT Press, 1991), which is incorporated herein by reference.

In another embodiment, optimization and allocation may be performed for more than one stage. Optimization and allocation may be performed for different numbers of stages, so long as the optimization is performed for at least as many stages as the allocation. This is advantageous, for example, if plans call for optimizing less than once per stage. It will be appreciated that other embodiments of the invention may make some or none of these assumptions.

1.4.1 Denotations

The following will describe one particular exemplary mathematical formulation that is implemented in an embodiment of the inventive system. The decision variables will be:

$F_{hijk}^{(t)}$: the number of impressions for creative (h,i) assigned to sub-channel (j,k) at stage t.

From the historical data, we have:

$X_{hijk}$: the payment units for creative (h,i) in sub-channel (j,k) based on historical data. For campaigns that are paying on a CPC basis, the units will be clicks. For campaigns that are paying on an CPA basis the units will be actions.

$Y_{hijk}$: the failures (number of impressions−number of actions) for creative (h,i) in sub-channel (j,k) based on historical data.

From the contract and inventory prediction:

$L_{jk}^{(t)}$: the number of impressions on sub-channel (j,k) that have been paid for at stage t. These impressions must be used, or lost.

$U_{jk}^{(t)}$: the maximum number of impressions that can be assigned to sub-channel (j,k) at stage t.

$T_{jk}^{(t)}$: the sunk cost for the first $L_{jk}^{(t)}$ impressions on sub-channel (j,k) at stage t. In cases where the total amount of inventory is fixed, this is the total cost of the inventory.

$P_j^{(t)}$: the cost for each impression exceeding $L_{jk}^{(t)}$ on channel j at stage t. In cases where incremental inventory can be generated at some marginal cost, this is the marginal cost of generating incremental inventory.

$D_h^{min}$: the minimum number of actions promised to campaign h.

$D_h^{max}$: the maximum number of actions to be delivered to campaign h.

$E_h$: the penalty per action for delivering fewer than $D_h^{min}$ actions.

$R_h$: the price per action when the total number of actions is less than $D_h^{max}$.

$G_h$: the price per action for those actions exceeding $D_h^{max}$.

1.4.2 Formulation

In one embodiment, the objective function is the network profitability; that is, the total revenue of the network minus the total cost of the network. This is equivalent to the sum of the profit for each campaign. The profit for a given campaign is the campaign revenue minus the campaign cost.

In another embodiment, the objective function is the network revenue. The optimization will seek to optimize revenue from advertisers. In other embodiments, the objective might be to minimize the cost of inventory used, or to minimize the variance in campaign performance.

In general the objective function may be any monotonically increasing function. The network may then be solved using any well-known non-linear optimization method, technique, or procedure. However, computational speed and accuracy may be increased by approximating the objective function with a piecewise linear function. Any non-linear objective function may be arbitrarily closely approximated by a piecewise linear function with a sufficient number of segments. In practice, most realistic objective functions may be well approximated with a small number of segments, for example, from 3 to 5 segments is generally sufficient, though fewer or more segments may be used. For example, any number of segments between 1 segment and about 10 segments may be used, and though more segments could be used are rarely required.

Figure 3:
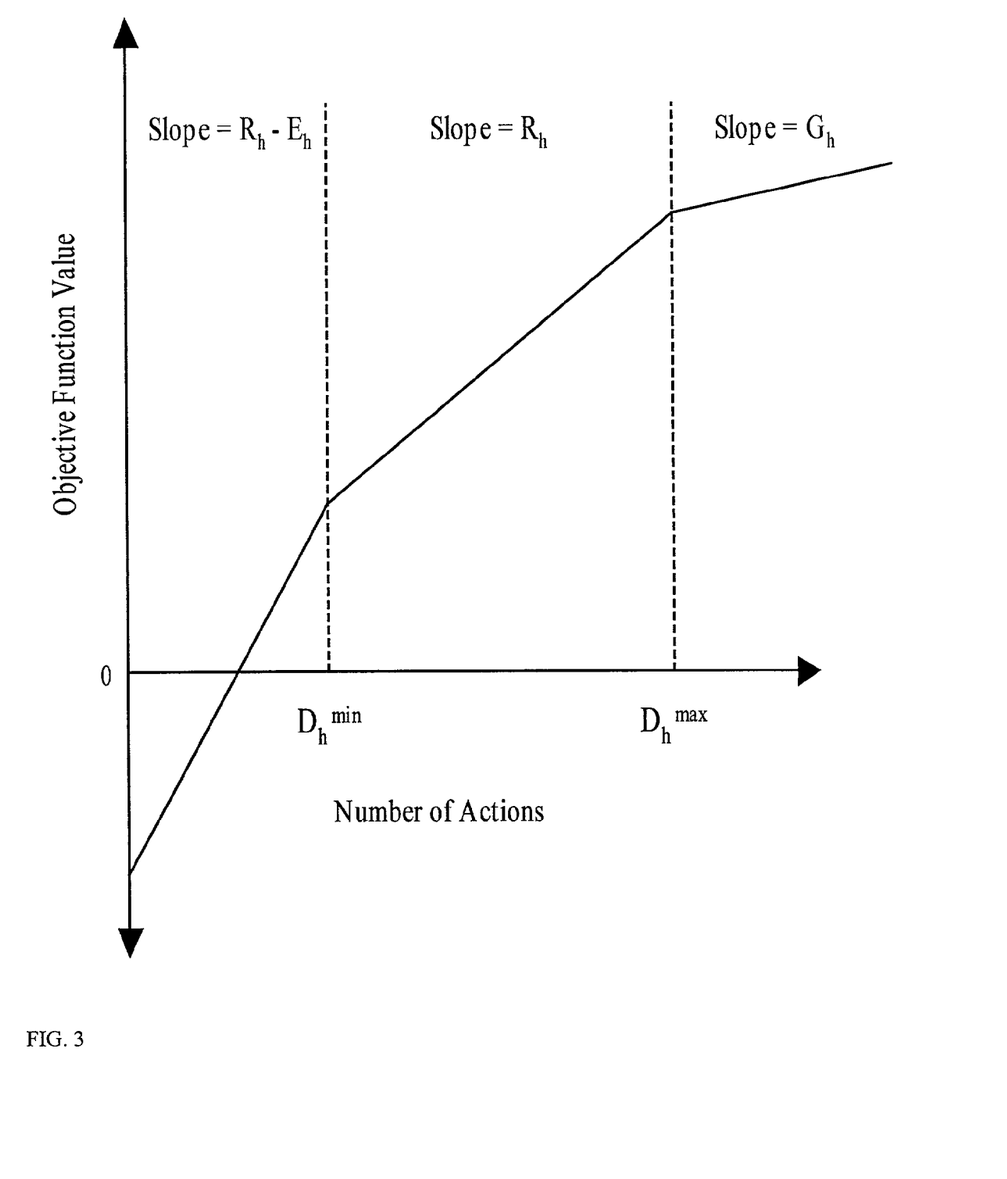
FIG. 3 is a diagrammatic illustration showing an exemplary piecewise linear objective function.

FIG. 3 shows an exemplary piecewise linear objective function. In this embodiment, three segments are used to approximate the objective function. The publisher receives $R_h$ for each action achieved below $D_h^{max}$, and is penalized $E_h$ for every action below $D_h^{min}$ that is not delivered. The publisher receives $G_h$ for each action achieved in excess of $D_h^{min}$. In this particular case, the publisher is in jeopardy of owing money to the advertiser in penalties if an insufficient number of actions are achieved. Those workers with ordinary skill in the art will notice that other contracts could be structured with more, less, or no jeopardy to the publisher. Additional piecewise segments require only additional D values to mark the boundaries of the segment, and additional slope values to denote the value of an action in that segment.

In one embodiment, when all campaigns and inventory are exchanged on a CPC, CPA, or CPM basis, the revenue function may be taken to be piecewise linear based on the parameters defined above. The embodiment described (See for example FIG. 2 and its accompanying description) includes three piecewise segments; those workers with ordinary skill in the art in light of the description provided herein will recognize that the formulation may be easily extended to as many segments as desired.

This piecewise linear payoff formulation provides a compact analytic expression that can represent a very broad variety of different contracts. The contracts are defined by the parameters ($E_h$, $R_h$, $D_h^{min}$, $D_h^{max}$, and $G_h$) described above, as well as the start and end dates of the campaign. For CPC and CPA campaigns, the publisher will receive $R_h$ dollars per click (or action) for all clicks below $D_h^{max}$. In addition, the publisher will pay a penalty of $E_h$ dollars per click for shortfall below $D_h^{min}$. If the publisher over-delivers, he will receive $G_h$ for each click above $D_h^{max}$. Those workers with ordinary skill in the art in light of the description provided herein will recognize that the payoff formula need not be denominated in dollars, or even in currency; any monotonically increasing payoff metric will suffice. Furthermore, other payoff metrics may be adopted.

The standard contract will have $D_{min} > 0$ and $D_{max} < \infty$. Such contracts will have a penalty for under-delivery, and may or may not have a payoff for over-delivery (that is, $G_h$ may or may not be greater than zero.) However, many other kinds of contracts can be represented with the piecewise linear formulation. For example, many publishers run "house ads;" advertisements for the publisher itself that run on unsold inventory. The publisher can estimate the value per click of the house campaign to set $R_h$. Setting $D_h^{min}$ to zero and $D_h^{max}$ to infinity will allow the allocation optimizer to use the house campaign any time there is sufficient inventory, or when the value of the house campaign exceeds the value of other paying campaigns. In other cases, $D_h^{max}$ and $G_h$ can be used to set "soft" or "hard" limits on the advertising spend. If the advertiser has a firm budget which may not be exceeded, $G_h$ may be set to zero. Then the maximum fee owed by the advertiser will be $R_h$ times $D_h^{max}$. On the other hand, if the advertiser has a less-stringent limit on the total spend, she can set $R_h$ times $D_h^{max}$ to be the spend limit, but include a positive $G_h < R_h$, so that if inventory is available at a low price, the inventive system and method will take advantage of that inventory.

Those workers with ordinary skill in the art in light of the description provided herein will notice that piecewise linear functions with more than three segments may be handled in an analogous manner.

CPA campaigns can be handled identically or in a non-identical but similar or analogous manner to that described for CPC campaigns, except that all contract parameters will refer to prices per action, and minimum and maximum required actions.

CPM campaigns are handled slightly differently. Since CPM campaigns typically have less flexibility in placement than other campaigns, there will generally be fewer campaign-channel arcs in the network, and thus fewer options for the allocation optimizer to choose among. The allocation optimizer needs to use whatever placement flexibility is available to maximize the number of actions achieved while the number of impressions used is constrained (in order to meet the contractual requirements). To do this, a "side constraint" is imposed on the campaign group node CG3 209 (See FIG. 2.) This additional constraint guarantees that the contractually mandated number of impressions is delivered while the total actions are maximized. In the case of CPM campaigns, the parameters ($E_h$, $R_h$, $D_h^{min}$, $D_h^{max}$, and $G_h$) are no longer contractually determined, but rather are determined by the publisher. The publisher chooses the pricing parameters by estimating the amount of revenue he is willing to forgo in order to deliver an extra action to the CPM advertiser; in other words, he is making a monetary estimate of the amount of goodwill engendered in the advertiser by exceptional performance.

Suppose that the expected number of actions generated by an arc $(h,i),(j,k)) \in v$ at stage t $(C_{hijk}^{(t)})$ is equal to the number of impressions assigned to this arc multiplied by the action rate. Revenue from campaign h is:

$$f_h(C_{hijk}^{(t)}) = \begin{cases} R_h \sum_{i,j,k,t} C_{hijk}^{(t)} - E_h\left(D_h^{min} - \sum_{i,j,k,t} C_{hijk}^{(t)}\right) & \text{if } \sum_{i,j,k,t} C_{hijk}^{(t)} \leq D_h^{min} \\ R_h \sum_{i,j,k,t} C_{hijk}^{(t)} & \text{if } D_h^{min} \leq \sum_{i,j,k,t} C_{hijk}^{(t)} \leq D_h^{max} \\ R_h D_h^{max} + G_h\left(\sum_{i,j,k,t} C_{hijk}^{(t)} - D_h^{max}\right) & \text{if } D_h^{max} \leq \sum_{i,j,k,t} C_{hijk}^{(t)} \end{cases}$$

This may be expressed in the following way, where quantities in parentheses marked by a "+" (plus sign superscript) are taken to be equal to the enclosed quantity if positive, or zero if the enclosed quantity is negative:

$$f_h(C_{hijk}^{(t)}) = R_h \sum_{i,j,k,t} C_{hijk}^{(t)} - E_h\left(D_h^{min} - \sum_{i,j,k,t} C_{hijk}^{(t)}\right)^+ - (R_h - G_h)\left(\sum_{i,j,k,t} C_{hijk}^{(t)} - D_h^{max}\right)^+$$

The second part of the profit is the cost. The total cost the network needs to pay to publishers is:

$$g(F_{hijk}^{(t)}) = \sum_{j,k} \left\{ P_j \left( \sum_{h,i,t} F_{hijk}^{(t)} - L_{jk}^{(t)} \right)^+ + T_{jk}^{(t)} \right\}$$

The foregoing illustrates in detail one embodiment of the optimization problem formulation. Those workers with ordinary skill in the art in light of the description provided herein will recognize that this is merely a representative formulation, and that other problem formulations may be used to achieve the goal of optimally allocating campaigns and creative to available inventory to maximize an objective function while respecting various requirements and constraints.

1.4.3 Constraints

The constraints that we have are the capacity constraints in each sub-channel (j,k) at stage t:

$$\sum_{hi} F_{hijk}^{(t)} \leq U_{jk}^{(t)},$$

and non-negativity on the assigned impressions for each (sub) channel:

$$F_{hijk}^{(t)} \geq 0$$

for all arcs $((h,i),(j,k)) \in V$ and all t from starting stage to ending stage of campaign h.

If the objective is to maximize expected total profit, the problem that we want to solve can be formulated as:

Maximize $$\sum_{h \in H} R_h \sum_{i,j,k,t} F_{ijk}^{(t)} \frac{X_{hijk}}{Y_{hijk} + X_{hijk}} - \sum_{h \in H} E_h \left( D_h^{min} - \sum_{i,j,k,t} F_{ijk}^{(t)} \frac{X_{hijk}}{Y_{hijk} + X_{hijk}} \right)^+ -$$

$$\sum_{h \in H} (R_h - G_h) \left( \sum_{i,j,k,t} F_{ijk}^{(t)} \frac{X_{hijk}}{Y_{hijk} + X_{hijk}} - D_h^{max} \right)^+ - \sum_{j,k} P_j \sum_{h,i,t} F_{hijk}^{(t)}$$

such that $$L_{jk}^{(t)} \leq \sum_{hi} F_{hijk}^{(t)} \leq U_{jk}^{(t)}$$

The foregoing illustrates in detail one embodiment of the optimization problem formulation. Those workers with ordinary skill in the art in light of the description provided herein will recognize that this is merely a representative formulation, and that other problem formulations may be used to achieve the goal of optimally allocating campaigns and creative to available inventory to maximize an objective function while respecting various requirements and constraints.

1.4.4 Generalized Linear Network Formulation

In order to make the optimal allocation plan practicable, we need to find a way to solve the optimization efficiently. The objective function is non-linear, which makes optimization less efficient. However, it is advantageous to add some dummy variables and constraints so that the objective function is linear. Furthermore, we can convert this optimization problem to a Generalized Linear Network Problem, improving computational speed.

In generalized linear network formulation, the decision variables are (i) the flow on each arc, and the constraints are: (ii) the capacity constraint for each arc, and (iii) the generalized network constraint for each node. In the generalized network cases, the outgoing flow for an arc is equal to a factor (in many network cases, the factor is 1) of the incoming flow for that arc. For each arc, there are six parameters need to be specified:

From_node(i): the node number that the arc i starts from.
To_node(i): the node number that the arc i goes to.
Cost(i): the revenue per flow passing through the arc i.
Factor(i): the discount factor between incoming and outgoing flow for the arc i.
UB(i): the flow upper bound for the arc i.
LB(i): the flow lower bound for the arc i.

1.4.5 Optimization Output

Once the campaign placement problem has been so formulated, it may be solved with any linear programming algorithm (e.g., interior point methods, simplex methods, or other know algorithms or procedures) or with an algorithm designed to efficiently solve generalized linear network problems. The result will be a set of "allocations;" that is, for every channel, the fraction of impressions that should be allocated to each campaign. This output will allow the Ad Server module 104 to make decisions on each real-time (or substantially real-time) request—serving advertisements to visitors in proportion to the allocations determined by the Allocation Optimization module 103.

In addition, the Allocation Optimization module 103 generates opportunity costs for every channel. The opportunity cost is the additional profit that would be achieved by the system if one additional unit of inventory (impression) were available on a given channel. Analysis of opportunity costs allows the publisher to identify his most valuable channels, helping him to focus his efforts on increasing visitors to his site on the most profitable areas.

1.5 Offer Generator

The Allocation Optimization module 103 determines the best allocation of campaigns based in part on the price paid by the advertiser for each click or impression. When a prospective advertiser approaches a publisher about running a campaign, the publisher needs to know what price to charge. The inventive system optionally provides a mechanism for determining the best price. The Offer Generator module 108 includes two stages; the first stage (called "pretesting") tests the prospective campaign on a small amount of inventory to get an estimate of the campaign performance. The second stage formulates a series of new network problems, each including the new campaign at a different price point. The solution to the network problem yields the profitability of the set of campaigns. The salesperson or other entity making the offer can then use the relationship between price and profitability to motivate her sales negotiations.

The offer generator module 108 is desirably designed to be replaceable and upgradable, so that improvements on the method may be easily incorporated. One embodiment of the offer generator is described here.

Figure 4:
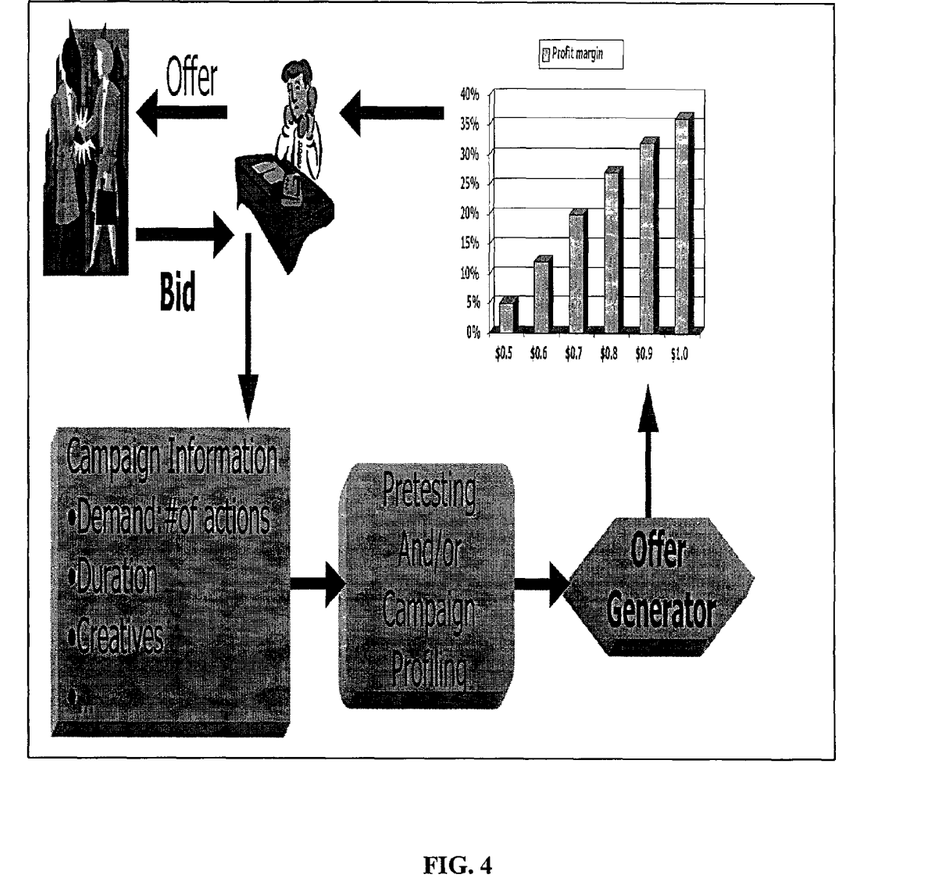
FIG. 4 is a diagrammatic illustration showing an embodiment of the offer generation process.

Based on the current network status and the pretesting results, the offer generator will provide estimates for the profit margins for different offers (that is, for different numbers of clicks or actions, duration and pricing). The information will aid a business manager to determine offer(s) to be made to a new advertiser or a publisher. The process flow for generating the offer according to one embodiment of the invention is shown in FIG. 4.

A salesperson attempting to negotiate a contract with an advertiser needs to have a solid understanding of the profitability of any proposed contract under discussion. Typically, the advertiser will have specific requirements for the non-financial contract variables listed above: contract start and end dates, as well as minimum and limiting numbers of units. In many cases, the pricing will depend on the performance of the creatives; thus, the set of creatives to be used in the campaign must be provided for the offer generation. The financial variables (the cost per unit, the penalty for delivering fewer units than promised, and the bonus for delivering over-limit units) are typically negotiated. In many cases, the cost per unit will be the primary negotiating point. The salesperson will enter the non-financial contract information, the penalties and bonuses, and provide the creatives. The Pretesting module 101 will characterize the creatives. The Offer Generation module 108 will then determine a range of prices and profit margins.

To do so, the Offer Generation module 108 defines a set of target profit margins, and then determines the prices that would need to be charged in order to meet those targets. The module will return a variety of prices and target margins to the salesperson, who can use that information to negotiate a mutually agreeable contract with the advertiser. An embodiment of the method for offer generator for a single new campaign is now described.

The Offer Generation module 108 proceeds by comparing the overall network profitability of a network containing the new campaign with a given pricing scheme, with the overall network profitability of a network that does not contain the new campaign. It is advantageous to obtain a profit margin on each new campaign. However, the profit margin may not be defined simply in the usual way; that is, as the total revenue generated from the campaign minus the total cost of inventory for the campaign, divided by the total revenue generated by the campaign. Such a calculation will ignore the influence of the new campaign on the rest of the network. In particular, the addition of a new campaign often forces other campaigns to be placed less efficiently in the network, lowering their profitability. Thus, the appropriate measure of the profitability and profit margin of a campaign is the total network profitability with and without the new campaign.

To find the profitability of a campaign, we first calculate the profitability of the network without the new campaign. To do so, we formulate the network problem and use the allocation optimization module 103 to determine the optimal allocation of campaign creatives to publisher inventory. We then calculate the total expected revenue from all campaigns in the network, and subtract the total inventory cost. The resulting figure is the "network profit." We may then consider a new network consisting of the old network plus the new campaign, defined by a given offer. Because the offer has not yet been agreed upon, this network formulation is temporary; it is a hypothetical analysis of the profitability of the system if the campaign as offered were to be agreed upon. The network is once again optimized, potentially resulting for different allocations of creatives from all campaigns to publisher inventory. The overall network profit is again calculated. The difference in these two profits is the profitability of the campaign.

1.5.1 Pretesting

The goal of the pretesting module 101 is to identify as quickly as possible the performance characteristics of those advertisements from a campaign that are most likely to be used by the Allocation module 103, while using as few resources (that is, impressions) as possible. Such identification will lead to accurate pricing by the Offer Generation module 108. It is advantageous to quantify the performance characteristics quickly since the quantification process will require advertisements to actually be tested on the available inventory, taking impressions away from other paying campaigns. Furthermore, some fraction of potential customers will not be satisfied with the publisher's pricing offer, and will choose not to continue the campaign. Efficient performance estimation will minimize the number of impressions wasted on potential customers that never develop into paying campaigns.

In the absence of any information about the performance of any of the arcs, this module assigns an equal number of impressions to all available arcs for the campaign in question. In following stages, when there exists an estimate (albeit possibly rough or of limited accuracy) for each of the arcs, the module orders the arc by the ratio of the click-through rate to the opportunity cost for the channel or subchannel, as determined by the Allocation optimization module 103 in the previous stage. These arcs are the arcs most likely to be used by the Allocation optimization module 103. Additional impressions are then allocated to each of the top N arcs (as ordered above), where N could be any number up to the total number of arcs. The value of N to be used depends on the total number of channels and subchannels available; in many cases, it is roughly 5 to 10 though fewer or more channels and subchannels may be used. This process may be repeated for as many stages as desired.

If prior information is available about the performance of a campaign on some or all channels, not all arcs will or may receive an equal number of impressions. If actual click (or action) and impression data is available for some or all arcs, then those data may advantageously be used in the calculation of the performance of that arc. In some cases, the historical data will be characterize the performance of the arc sufficiently precisely that no additional pretesting is required; in other cases, reduced pretesting will determine the performance to the required accuracy.

In another embodiment, the pretesting module 101 assigns different numbers of impressions to each available arc based on information obtained previously that might be relevant to the performance of the arcs. In another embodiment, the module randomly separates the arcs into two or more groups, each receiving a different number of impressions.

In another embodiment, the available arcs are sorted by click-through rate, rather than the click-through rate to opportunity cost ratio. In another embodiment, the arcs are sorted by an action rate, either alone or in a ratio with opportunity cost. In another embodiment, the arcs are sorted according to their expected return on a continuous metric, either alone or in combination with opportunity cost.

1.5.2 Offer Generation

Advertisers who wish to add a campaign to the network will pay according to an agreed-upon schedule, in return for a guarantee of certain performance measures. Though different agreements and terms within agreements may be contracted for, an agreement with an advertiser may typically specify some or all of the following:

Campaign starting date
Campaign ending date
Creatives to be used in the campaign
Minimum number of impressions (if CPM), clicks (if CPC), or actions (if CPA) to be delivered
Limiting number of impressions (if CPM), clicks (if CPC), or actions (if CPA) to be delivered
Price per impression (if CPM), click (if CPC), or action (if CPA)

Penalty if fewer than the minimum number of units are delivered by the campaign ending date Price per impression (if CPM), click (if CPC), or action (if CPA) delivered beyond limit An "offer" is defined as a set of values for each of the variables listed above. A "unit" is defined as the measurement of choice for a campaign: either impressions, clicks, or actions. The Advertiser Offer Generation module 108 will generate a range of offers based on the current and future network status, the campaign requirements, and the profitability targets specified by a network operator. This range will serve as a guideline to the salesperson negotiating a contract with an advertiser.

When a new campaign would like to join the network, we need a dynamic offer generation mechanism to determine a pricing scheme that reflects the performance of the campaign and minimizes the financial risk to the network. It is advantageous to evaluate offers in terms of their profit margin. Suppose that there is a set of campaigns already in the network (say H) and a new campaign $h \notin H$. The profit margin for the new campaign h is defined as:

$$\frac{\text{The optimal network profit for } (H \cup \{h\}) - \text{The optimal network profit for } (H)}{\text{The total revenue generated by campaign } h}$$

The salesperson can use this information on the price vs. profit margin tradeoff to ensure that all contracts agreed upon support his or her short-term or long-term business objectives.

1.6 User Interface

The specification of input parameters and the generation of reports on the placement and performance of advertisements may optionally be performed through a user interface 106. The system includes a user interface that allows for specification and/or reporting of one or more of the following:

- specification of campaigns and channels
- specification of inventory
- specification of optimization objectives
- specification of constraints
- reports on the performance of various channels
- reports on the optimization boost achieved because of using the system
- reports on the number of impressions, clicks and/or actions served for different advertisers
- specification and reporting of other inputs or parameters as necessary
- reporting of other placement and/or performance information as necessary

1.7 Inventory Module

In order to determine the resources needed to satisfy the campaign constraints, the Allocation Optimizer 103 needs an estimate of the amount of inventory (that is, number of impressions to be served) on each channel on each day. This depends on the number of visitors who view the publisher's channel on that particular day, so it is unknown beforehand. The inventory module 107 uses past data and expected behavior to forecast the number of impressions available on each channel on each day.

The inventory module 107 is designed to be replaceable, so that improvements may be easily incorporated.

In one embodiment, the inventory forecast may simply be the daily historical average number of impressions served for each channel. In other embodiments, the forecast may be made more sophisticated by incorporating seasonal or day-of-the-week variation, time-of-day information, or current inventory trends.

1.8 Profiling Module

The system may optionally include a profiling module 109. The profiling module 109 uses demographic, psychographic, and/or other information along with campaign performance data to advantageously divide channels into subchannels. For example, the profiling module 109 could divide a single channel into two subchannels, based on time of day, with "local daytime hours" constituting one subchannel, and "local evening/night hours" constituting the other. If there are differences in campaign performance in those two subchannels, the Allocation Optimization module 103 will be able to exploit those differences to further optimize the metric of interest (e.g., profit).

The profiling module 109 can also help in selecting the best channels or subchannels for a new advertiser based on historical performance of the advertiser or similar advertiser on a given channel or subchannel or related channels and subchannels. This information can be used by testing and pretesting module to focus on the better performing channels and subchannels and reduce the overhead (in terms of the number of impressions required, for example) of testing and pretesting respectively. This will, in general, lead to better overall optimization.

1.9 Ad Server Module

The Ad Server module 104 is responsible for the real-time interaction with visitors. When each visitor views a channel, the Ad Server module 104 decides which advertisement to show, and then either serves the advertisement itself or directs an external server to serve the advertisement. In addition, the Ad Server module 104 is responsible for "action tracking" and "action matching."

Action tracking involves accounting for both the number of advertisements served, and the number of actions (clicks or other post-click actions) taken for each campaign, creative, and channel. In addition, the impression and action tracking may also include tracking by demographic, psychographic, or other such information. Action matching involves linking clicks (or other post-click actions) with the impression that lead to the click. This linking of effect with cause allows the performance of campaigns and creatives to be accurately measured, thus providing reliable input data for the optimization processes.

The Ad Server module 104 functionality is typically provided in one of two ways. First, the system can include an ad server module directly. The system is then fully capable of providing advertising campaign management for the publisher's inventory. Second, the ad server functionality may be outsourced to an independent system, operated by the publisher or even by a third party. The advantage to outsourcing the ad server module is that the operational issues of extremely high reliability and large bandwidth may be separated from the optimization system.

2.0 Additional Embodiments

While the inventive system has been described above in the context of banner advertisements served on a publisher's inventory, there are a number of analogous situations where the inventive system may be advantageously deployed. All of these situations involve inventory management, where the value of the inventory differs among the various potential consumers, and where the producer of the inventory wishes to optimally allocate his inventory to his consumers to maximize an objective function.

2.1 Publisher Inventory Optimization

As described elsewhere in this description, a publisher may profitably employ the inventive system and method to maximize the profitability of his or her inventory. As described, the inventive system maximizes the revenue (in the case of CPC and CPA campaigns) or goodwill (in the case of CPM campaigns) generated by the available inventory.

2.2 Email Newsletters

Another profitable business use of the inventive system and method is the "email newsletter." Many organizations distribute a regular newsletter via email to a list of recipients. These newsletters often carry advertisements—either as embedded text, or as HTML links that are served when the recipient opens the email. In either case, the inventive system and method may be employed to optimize the choice and placement of advertisements within the newsletter.

Each space set apart for advertisements may be considered a "channel" as defined above. In addition, if demographic and/or psychographic information about the recipients is available, that information may be used to further divide the channels into subchannels. If embedded-text advertisements are to be used, the system would then consider each regular occurrence, or issue, of the newsletter to comprise a separate stage. Advertisements would be placed in each newsletter so as to maximize an objective function (e.g., profit) based on the performance observed in previous issues while respecting contractual constraints and requirements. Alternatively, if dynamic advertisements (such as HTML) are placed in the newsletter, the allocations of campaigns and creative to a given channel or subchannel may be set after the email has been sent. In such cases, the inventive system may observe the performance of the first recipients to open the newsletter, then dynamically reallocate campaigns and creatives for later recipients. When those later recipients eventually do open their newsletter, the system will serve them the campaign and creative deemed most advantageous at the time. Such dynamic advertisements allow the use of data both within and between newsletter issues; in such cases, for the purposes of allocation, a stage is defined as the shortest time interval on which to update allocations.

2.3 Optimized Advertising Exchange Networks

The inventive system, method, and business model may also be advantageously employed by a third party acting as an advertising exchange network. This party could purchase advertising inventory from a variety of publishers, either on a CPM, CPC, or CPA basis. It could then re-sell the inventory to advertisers, either on a CPM, CPC, or CPA basis. By using the inventive system to optimally place advertisers' campaigns on available inventory, the party could generate a profit even while giving better rates and contract types to both advertisers and publishers than they would have been able to achieve otherwise. In such a case, a publisher-side offer generator may be advantageously employed. The publisher-side offer generator is analogous to the (advertiser-side) offer generator described above, except that publisher inventory is tested for its profitability within the network. A resulting set of price vs. profit margin comparisons assists the salesperson in determining a contract that will meet the network's short- and long-term business goals.

2.4 Email List Providers

Another situation in which the inventive system and method may be advantageously employed is in the use of email address list management. Providers of email address lists ("email lists") have a set of inventory in their email address lists. Providers are typically willing to send email to list addresses at a certain frequency, and have a number of advertising campaign contracts to satisfy. In this case, email lists may be considered as channels per the above definition. The provider thus has one or more channels worth of inventory, which may or may not be divided into subchannels, that must be allocated to the various campaigns in such a way as to maximize response while meeting campaign constraints and requirements. The inventive system can use response from previous email drops (in the case of static email) or from previous and current drops (in the case of dynamic email) to optimally allocate email campaigns to lists or subdivisions of lists. In the former case, each email drop is considered a separate stage. In the latter, stages are defined by the smallest period of time for which allocations will be updated.

2.5 Multiple-SKU Optimization

In some cases, a vendor may have a number of different types of inventory available. For example, a travel agency might have package tours to Hawaii, the Caribbean, and Europe, as well as cruises to Mexico. Alternatively, a computer manufacturer may have surplus computer hardware available for sale. Each type of inventory, or "SKU," typically has a different profit margin; in addition, each type of inventory is limited in number available. The inventive system can be usefully employed to advertise the available inventory in such a way to maximize profits while respecting inventory constraints.

A vendor may, for example, maintain a web site where prospective customers visit. By advertising different inventory on different channels within that site, the vendor can influence visitors to buy different SKUs. Returning to the travel agency example, the agency web site might display more prominent advertisements for more profitable SKUs. The inventive system may be employed to ensure that the most profitable mix of promotional material is displayed while respecting the limited number of each SKU available.

2.6 Commodity Exchange System

The inventive system may be advantageously employed in any commodity exchange system in which the commodity has a different value to different consumers. For example, if different grades of commodity are available at different geographical locations, the value of a unit of commodity will depend on the geographic proximity to the consumer as well as the grade of commodity required by the consumer. The value of the inventive system can be seen in the following example. Suppose that a particular consumer requires only low-grade commodity. However, suppose that he is very close to a high-grade commodity producer, and far from low-grade producers. It may be less expensive for the consumer to purchase the nearby, high-grade commodity than to purchase the more distant, low-grade commodity. However, an optimal commodity exchange system may determine that the extra cost is justified, since allocating the high-grade commodity to a distant high-grade consumer may result in a more efficient overall system. These gains in efficiency result in profit to the commodity exchange system.

The foregoing description, for purposes of explanation, used specific nomenclature to provide a thorough understanding of the invention. However, it will be apparent to one skilled in the art in light of the description provided that the specific details are not required in order to practice the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. An article comprising a tangible machine readable medium that stores a program, the program being executable by a machine to automate online advertising campaign placement using historical performance data, an available publisher inventory of locations on web pages and impressions on those web pages, a particular location on a web page being a publisher channel, and contract information that includes a set of one or more contract parameters, wherein an advertiser has associated therewith a set of one or more campaigns, and a set of creatives for each campaign, a combination of an advertiser campaign and a publisher channel defining an campaign/channel arc, the program comprising:

a pretesting code module adapted to identify, from a set of campaign/channel arcs associated with the available publisher inventory and the set of one or more campaigns, a subset of campaign/channel arcs that are to be tested, wherein the subset of arcs are identified either randomly or using performance data from a prior advertiser campaign with respect to the channels;

a testing code module adapted to use the subset of arcs identified by the pretesting code module and a first portion of the inventory to identify a further subset of campaign/channel arcs that are expected to perform well while minimizing a likelihood of excluding an effective campaign/channel arc and an amount of the inventory used by the testing code module for testing; and an allocation optimization module adapted to use the further subset of campaign/channel arcs identified by the testing code module and a second, remaining portion of the inventory to generate a set of allocations, wherein a given allocation identifies, for each publisher channel, a fraction of the set of impressions that should be allocated to each creative of each campaign in the set of campaigns, wherein the allocations are generated by solving an objective campaign placement function as a piecewise linear function having at least one segment whose slope is defined by values associated with the one or more contract parameters.

2. The article as described in claim 1 wherein the objective campaign placement function is derived from a non-linear objective function.

3. The article as described in claim 2 wherein the piecewise linear function is associated with one of: advertising network profitability, advertising network revenue, inventory cost, and campaign performance variance.

4. The article as described in claim 1 wherein an estimate of campaign performance is formulated into the objective campaign placement function.

5. The article as described in claim 1 wherein the piecewise linear function is a monotonically increasing function.

6. The article as described in claim 1 wherein the piecewise linear function has a first segment, a second segment, and a third segment, the first segment having a slope equal to a difference between the price per action value and the penalty per action value, the second segment having a slope equal to the price per action value, and the third segment having a slope equal to the premium per action value, wherein the first and second segments are connected at a minimum associated with the number of actions promised to the campaign, and wherein the second and third segments are connected at a maximum associated with the number of actions promised to the campaign.

7. The article as described in claim 6 wherein the campaign is a cost per click (CPC) campaign, a cost per action (CPA) campaign, or a cost per thousand (CPM) campaign.

* * * * *